United States Patent [19]

Rodgers et al.

[11] Patent Number: 5,246,501

[45] Date of Patent: Sep. 21, 1993

[54] FLASH DRYING TREATMENT OF SOLVENT FROM WORKPIECES

[75] Inventors: Joel E. Rodgers, Convent Station, N.J.; Michael J. Ruckriegel, Wheaton; Algar Saulic, Chicago, both of Ill.; Harry F. Osterman, Westfield, N.J.

[73] Assignee: AlliedSignal Inc., Morris Township, Morris County, N.J.

[21] Appl. No.: 673,699

[22] Filed: Mar. 22, 1991

Related U.S. Application Data

[63] Continuation-in-part of Ser. No. 624,008, Dec. 7, 1990.

[51] Int. Cl.⁵ .................................................. B08B 3/10
[52] U.S. Cl. .................................... 134/10; 134/15; 134/122 R; 134/64 R; 134/105
[58] Field of Search ............... 134/102, 64 R, 122 R, 134/108, 105, 10, 19, 15; 68/5 E, 18 F

[56] References Cited

U.S. PATENT DOCUMENTS

| | | | |
|---|---|---|---|
| 2,270,642 | 1/1942 | Somes | 134/108 X |
| 3,070,463 | 12/1962 | Barday . | |
| 3,144,872 | 8/1964 | Kearney | 134/108 X |
| 3,491,778 | 1/1970 | Lehnert et al. | 134/64 R |
| 3,498,303 | 3/1970 | Eaves et al. . | |
| 3,665,734 | 5/1972 | Hauser et al. | 68/18 F |
| 3,712,085 | 1/1973 | Guberman et al. | 68/18 F |
| 3,718,147 | 2/1973 | Laroche | 134/108 X |
| 4,032,033 | 6/1977 | Chu et al. | 134/108 X |
| 4,055,196 | 10/1977 | Kearney . | |
| 4,240,453 | 12/1980 | Vial et al. . | |
| 4,256,512 | 3/1981 | Ammann et al. | 134/64 R |
| 4,261,111 | 4/1981 | Rand . | |
| 4,499,743 | 2/1985 | Maestrelli | 68/18 C |
| 4,529,032 | 7/1985 | Molitor . | |
| 4,532,983 | 8/1985 | Bradshaw et al. . | |
| 4,605,027 | 8/1986 | Dallot | 134/108 |
| 4,798,218 | 1/1989 | Sauvan . | |
| 5,085,238 | 2/1992 | Baldwin | 134/105 |

*Primary Examiner*—Frankie L. Stinson
*Attorney, Agent, or Firm*—Colleen D. Szuch; Jay P. Friedenson

[57] ABSTRACT

A solvent control arrangement for stripping liquid solvent from parts being degreased/defluxed in a degreaser or defluxer by intimate contact with liquid solvent or a vapor phase thereof is disclosed. The solvent control arrangement comprises a tank or box having an open end extending downwardly into the vapor zone in an exit area of the degreaser/defluxer to define a flash drying chamber above and in communication with the vapor zone. The solvent covered parts are directed into the flash drying chamber from the vapor zone where heat is applied to heat the air in the flash drying chamber to a temperature above the solvent boiling point to thereby evaporate liquid solvent on the parts. The parts are then returned from the chamber into the vapor zone where they ultimately exit the degreaser/defluxer from the exit end. Optionally, condensing coils may be disposed in the chamber at the vapor line to condense solvent in the chamber and prevent the solvent vapor zone from encroaching within the chamber. The amount of solvent within the chamber may be further controlled through an outlet duct arrangement directing solvent laden air from the chamber through dehumidifying coils, molecular sieves, carbon absorption filters or like solvent stripping mechanisms.

31 Claims, 9 Drawing Sheets

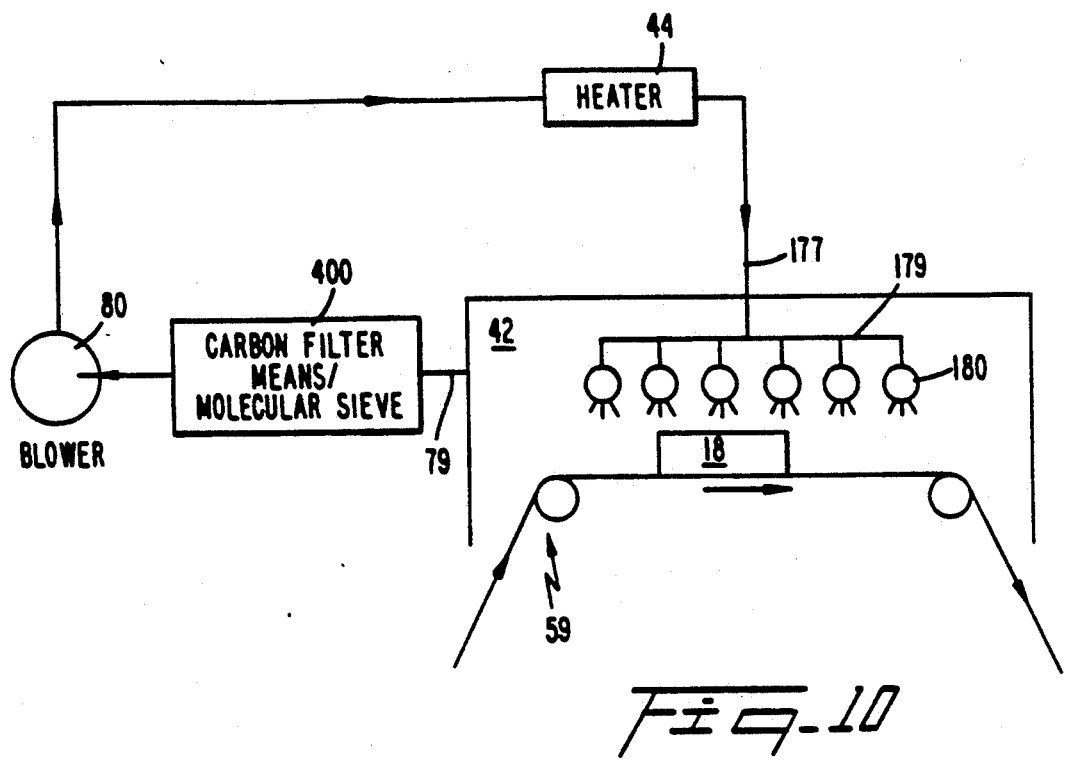

FLASH DRYING TREATMENT OF SOLVENT FROM WORKPIECES

RELATED APPLICATIONS

The present application is a continuation-in-part of application Ser. No. 624,008, filed Dec. 7, 1990 still pending, for "Solvent Drying Treatment Of Workpiece Surfaces."

TECHNICAL FIELD

The present invention relates generally to method and apparatus for solvent cleaning of articles, such as printed circuit boards, in a vapor degreaser or solvent defluxer. More particularly, the invention relates to the removal and recovery of liquid solvent from the articles or parts exiting the degreaser/defluxer, wherein the liquid solvent coats and/or is entrapped within the parts which would result in excessive solvent loss upon exiting the degreaser/defluxer.

BACKGROUND OF THE INVENTION

Degreasers and defluxers are commonly used for degreasing, precision cleaning and defluxing of various articles, such as removing solder or flux from printed circuit boards. The articles are typically conveyed through one or more solvent zones within the degreaser/defluxer for contact with a solvent, such as fluorocarbon based CFC-113, manufactured by Genesol/Baron-Blakeslee, Melrose Park, Ill., a division of Allied-Signal Incorporated, assignee of the present invention. The articles are cleaned by entering the degreaser/defluxer on a conveyor through an entrance end thereof for passage through a solvent vapor zone, immersion within liquid solvent, solvent spraying, or any combination thereof. The articles are then conveyed from the degreaser/defluxer through an exit end.

Parts may also be degreased or defluxed by the use of open top degreasers or defluxers of a type disclosed in U.S. Pat. No. 4,261,111 to Rand, issued April, 1981. An open top degreaser or defluxer generally comprises a tank having side walls forming a rinse and/or boil sump at the tank bottom where solvent is heated to form a vapor zone thereabove. Condensing coils define the upper limit (i.e., vapor line) of the vapor zone with an overhead freeboard region extending to the open top. Parts to be cleaned are submerged into the sump and/or the vapor zone through the open top and are similarly removed.

The entrance and exit ends of conventional conveyorized degreaser/defluxer equipment, and the open top of the open top degreasing/defluxing equipment, are generally in open communication with the ambient environment and the solvent within the equipment. Consequently, there is a loss of solvent to the surrounding environment caused by diffusion of solvent vapor into the air. This problem is exacerbated by air drafts entering the equipment through the entrance and/or exit ends and creating turbulence therewithin.

Solvent vapor loss also occurs by evaporation of the solvent as the solvent covered articles exit the equipment. The evaporation problem may be as significant as the solvent diffusion problem depending upon the geometry and number of parts being cleaned.

The use of CFC-113 and Freon type solvents and vapor emission thereof into the environment also contributes to undesirable stratospheric ozone depletion. Consequently, it is expected that new HCFC solvents, which effect the environment significantly less than the CFC-113 and Freon type solvents, will replace the latter in accordance with environmentally safe operating principles. However, since these new HCFC solvents boil at much lower temperatures (e.g. 82° F.–86° F.) than the above solvents (103° F.–118° F.) currently being used, solvent loss is likely to increase, particularly as a result of evaporation of liquid solvent coating the articles as the articles are conveyed from the degreaser or defluxer equipment through the exit end thereof, or removed through an open top of an open top degreaser/defluxer.

In the aforementioned co-pending application, the problem of preventing solvent vapor loss by minimizing solvent evaporation as the solvent covered articles exit the equipment is addressed through the application of heat by placement of heating coil means within the vapor zone located in the exit end and passing the articles in proximity of the heating coil means to evaporate the liquid solvent therefrom. More specifically, the heating coils utilize waste heat from a compression-expansion type refrigeration system which conventionally supplies chilled refrigerant to one or more condensing coils maintaining the vapor line within the degreaser/defluxer to reduce solvent emissions. These condensing coils typically serve as expansion coils within the refrigeration system and are situated in a known manner in various locations within the vessel and entrance/exit ends thereof. The refrigeration system conventionally includes a compressor section and an evaporator section. The compressor section has a compressor which compresses a refrigerant gas received from the condensing coils (evaporator section) into a hot refrigerant gas which is directed to the heating coils functioning as a condenser within the compressor section. After releasing the heat to dry the parts, as aforesaid, the refrigerant is then directed through an expansion valve into the condensing coils.

As a result of extensive experimentation, it was discovered that the heat from the aforementioned heating coils may not fully dry the parts if liquid solvent or solvent droplets were trapped under or within the parts, usually as a result of the parts having a complex surface geometry. It is theorized by the present inventors that the inability to sufficiently dry the parts stems from trying to heat and thereby evaporate the liquid solvent (coating or trapped within the parts) within the vapor zone. Within the vapor zone, the vapor temperature is constant and in steady state. To raise the vapor temperature it is necessary to superheat the vapor. Furthermore, the solvent vapor itself within the vapor zone is an excellent insulator which prevents heat from the heating coils from radiating towards the parts, unless the heating coils are brought extremely close to the parts to overcome the insulating effects of the solvent vapors within the vapor zone. Such close placement of the heating coils or source to the parts is not always feasible.

SUMMARY OF THE INVENTION

It is accordingly one object of the present invention to prevent the escape of solvent vapors from degreasing/defluxing equipment to the surrounding environment.

Another object of the invention is to prevent liquid solvent coating or trapped within articles or parts exiting the degreaser or defluxer from evaporating into the surrounding environment.

Still another object of the invention is to prevent solvent loss by heating the solvent coated parts during conveyance from the equipment to thereby evaporate the solvent from these parts before they exit from the degreaser/defluxer equipment.

Yet another object of the invention is to evaporate the solvent from these parts in a closed chamber which is open only to the vapor zone.

A further object is to evaporate the solvent from the solvent coated parts by heating the surface of the parts to a temperature above the solvent boiling point at which point solvent trapped within the parts will flash off and the part will be heated above the vapor temperature so that the part can then be returned to the vapor zone without condensing solvent since the part is warmer than the solvent vapor and thereby the parts can exit the equipment in a normal but "dryer" manner.

The present invention is directed to an improvement in a vapor degreaser or solvent defluxer having a vessel containing a solvent liquid with a vapor phase extending thereabove having a vapor defining an upper limit of the vapor zone. The parts to be defluxed or degreased are brought into the vessel into intimate cleaning contact with the solvent, either by immersion into liquid solvent, being sprayed with solvent, or exposure to solvent vapor in a vapor zone, or any combination of the above. The cleaned parts tend to contain liquid solvent trapped or coated on the parts. In accordance with the present invention, the improvement comprises a housing defining a flash drying treatment chamber extending above the vapor line in communication with the vapor zone. The parts are conveyed out of the vapor zone into the flash drying chamber and thereafter back into the vapor zone. A heating arrangement heats the air in the flash drying chamber to a temperature above the solvent boiling point to thereby evaporate the liquid solvent on the parts.

The flash drying chamber is preferably a tank or a box with a closed top and an open bottom defined by lower edges of tank or box side walls extending into the vapor zone below the vapor line. The parts enter and exit the flash drying chamber from the vapor zone through the open bottom.

The heating arrangement may be disposed in the flash drying chamber and various heating sources may be utilized which preferably do not generate a surface temperature (at the heating source) which would cause solvent breakdown. The heating source may be electrical heating elements, infrared, hot water, steam or hot refrigerant gas pumped into the flash drying chamber through a closed coil system.

In known types of conveyorized or open top degreasers/defluxers, a compression-expansion type refrigeration system conventionally supplies chilled refrigerant to one or more chill coils which are the refrigeration system expansion coils (evaporator section). These coils are situated in a known manner at various locations within the vessel and typically at entrance and exit ends thereof to define the upper extent (i.e., vapor line) of the vapor zone(s) through which zone(s) the parts are cleaned by contact with solvent vapor or liquid. The refrigeration system conventionally includes a condenser which receives compressed hot refrigerant gas from a compressor to dissipate heat from the refrigeration system. The cooler refrigerant is then expanded through an expansion valve and thereby chilled before entering the chill coils prior to being re-compressed by the compressor. In accordance with another feature of this invention, the condenser of the refrigeration system may be located within the flash drying chamber to heat the air within the chamber to a temperature above the solvent boiling point to thereby flash liquid solvent from the parts.

Optionally, additional chill coils may be disposed within the flash drying chamber at an elevation coextensive with the vapor line. These chill coils may be connected to the conventional chill coils disposed elsewhere within the degreaser/defluxer, either in series or in a parallel circuit. These additional chill coils maintain the vapor line at a desired level to protect the integrity of the flash drying chamber (i.e., to prevent excessive encroachment of the vapor zone upwardly into the chamber).

With the foregoing invention, the flash drying chamber mainly comprises air located above the vapor zone. Advantageously, this air is relatively easy to heat to a temperature above the solvent boiling point to enable solvent trapped within parts entering the chamber to flash off. Since the surface of the part tends to be heated to above vapor temperature as well, the part can then be moved back into the vapor zone without condensing solvent onto it since the part is warmer than the vapor in the zone and can therefore exit the machine in a "dry" state which minimizes solvent loss.

The solvent which has evaporated into the flash drying chamber may eventually result in an increased concentration of solvent vapor within the air chamber. This heavier solvent vapor will tend to flow downwardly in the chamber towards the vapor zone and may be absorbed by the vapor zone. With the optional chill coils, this solvent vapor will be condensed and thereby removed from the flash drying chamber into the vapor zone.

In accordance with a different embodiment of the invention, solvent vapor concentrations within the flash drying chamber may be maintained at a low level (i.e., to facilitate heating of the air in the chamber to above solvent boiling point temperature) with an auxiliary housing connected to the chamber through inlet and outlet ducts. The auxiliary housing may contain a heating source and a solvent removal arrangement positioned downstream from a blower. The blower forces air across a solvent removal arrangement and then across the heating source to thereby enable heated air to enter the chamber through the inlet duct to dry the part(s).

Optionally, the solvent laden air may be pulled from the chamber through the outlet duct and passed over the solvent removal arrangement which can be located on the suction side of the blower with the heating source located on the output side of the blower.

The solvent removal arrangement may be a dehumidifying coil with means for returning the condensed solvent to the degreaser or defluxer which has been stripped from the solvent laden air. Molecular sieves or membranes, or activated carbon filters may be used either singly or in combination with each other or the dehumidifying coil to strip the solvent from the solvent laden air.

When solvent is stripped from the solvent laden air utilizing activated carbon filters of known construction, the stripped solvent can be reclaimed from the activated carbon using conventional steam and gas stripping processes.

The dehumidifying coil may be a chill coil connected in series or parallel to the chill coils of the conventional refrigeration system.

A method of recovering solvent by preventing its outflux from a vapor degreaser or a solvent defluxer is also disclosed. The method of the invention comprises the steps of moving articles from an entrance or an open end of the degreaser or defluxer into a vessel thereof containing solvent where the articles pass into intimate cleaning contact with the solvent and/or its vapor phase. The cleaned articles are then moved from the vessel towards an exit end of the degreaser or defluxer. The cleaned articles or parts tend to contain solvent liquid trapped or coated on the parts. In the exit end-/area of the degreaser or defluxer, the parts pass from the vapor zone into a flash drying chamber located above but in communication with the vapor zone. The air in the flash drying chamber is heated to a temperature above the solvent boiling point to thereby evaporate or flash the liquid solvent from the parts. The parts then reenter the vapor zone prior to exiting the degreaser/defluxer. Since the surface temperature of the parts is at or greater than the solvent boiling temperature, solvent vapor within the vapor zone cannot condense onto the parts. The cleaned parts therefore emerge from the degreaser/defluxer in a relatively dry state, substantially free of solvent liquid.

The other objects and advantages of the present invention will be become readily apparent to those skilled in the art from the following detailed description wherein only the preferred embodiments of the invention are shown and described, simply by way of illustration of the mode contemplated of carrying out the invention. As will be realized, the invention is capable of other and different embodiments, and that several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 10 is a schematic view of another embodiment of the invention.

BEST MODE FOR CARRYING OUT THE INVENTION

Figure 1:
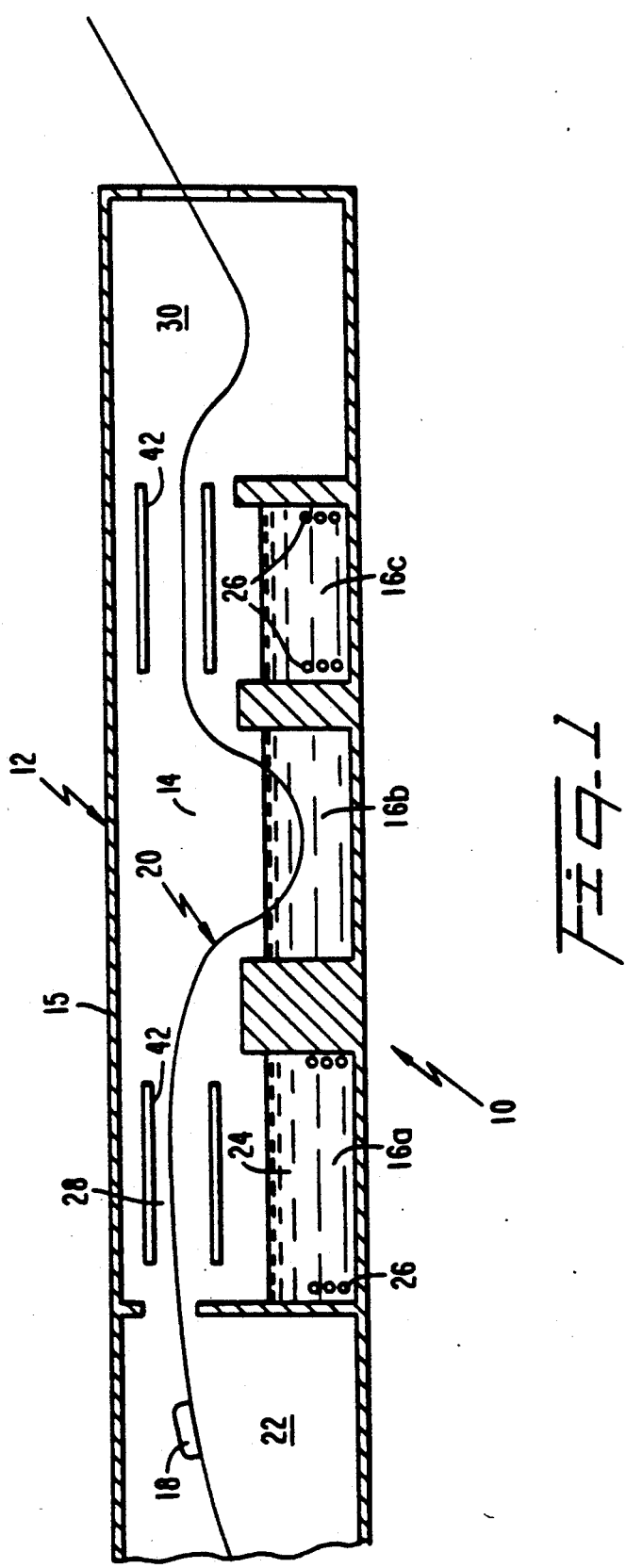
FIG. 1 is a schematic, elevational view of conventional degreasing or defluxing equipment utilizing a conveyor for moving parts through the equipment and into solvent removing contact with the invention.

A degreaser or defluxer 10 to which the present invention may be applied is schematically depicted in FIG. 1 and is of well known construction, typifying conveyorized, in-line degreasing/defluxing equipment in its broad aspects. Degreaser or defluxer 10 generally comprises a housing or vessel 12 formed with side and top body members generally indicated with reference numerals 14 and 15, respectively, and is divided into one or more self contained regions, 16a, 16b and 16c, through which articles 18 to be degreased are conveyed along a conveyor 20. The articles 18 are initially conveyed into an entrance end 22 and may then be conveyed into cleaning region 16a comprising a reservoir 24 of solvent liquid which is heated with immersed electrical heating coils 26 to form a solvent vapor zone 28 through which the conveyor 20 passes in a known manner to effect cleaning contact of articles 18 with the solvent vapor in the zone.

The conveyor 20 may then convey the articles 18 into a second solvent cleaning region 16b in which the conveyor flow path descends to immerse the articles into the liquid solvent in cleaning contact. Optionally, the conveyor 20 may then convey the articles into a third cleaning region 16c which is substantially identical to the cleaning region 16a. Depending upon the type of articles being cleaned, one of ordinary skill in the art will understand that the number, types and arrangement of cleaning stations 16a-16c may be varied to suit the particular requirements.

Figure 3:
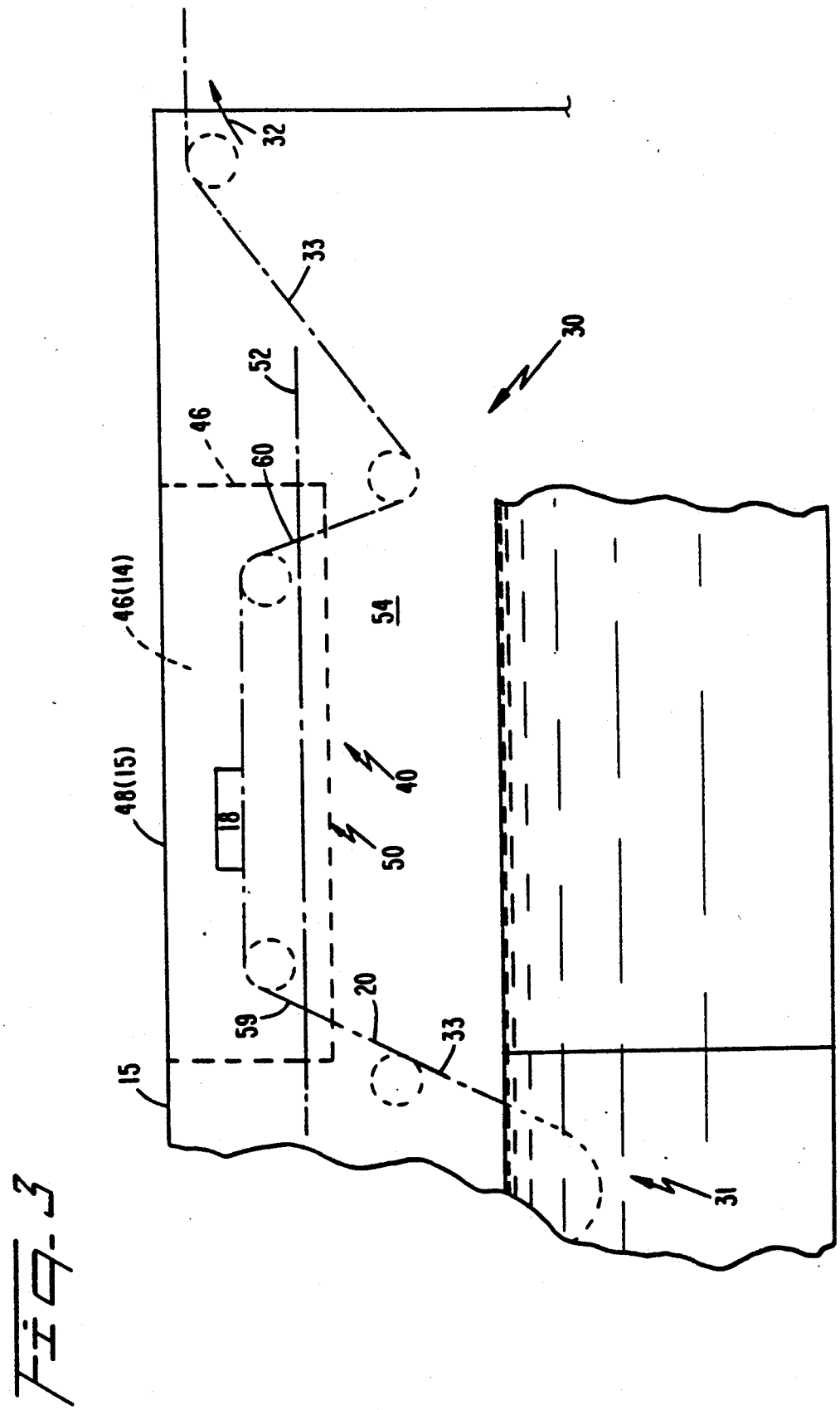
FIG. 3 is a schematic view of the invention depicted in FIG. 2 to depict further aspects of that invention.

The conveyed articles exiting the working or cleaning chamber 16c are then conveyed into the exit end 30 of the degreaser or defluxer 10 where excess or dripping solvent from the parts is collected and drained in a known manner for reuse. As depicted in FIG. 3, the conveyor flow path 20 in the exit end 30 is typically formed with a low point 31 and an upwardly inclined section 33 towards the outlet end 32 of the degreaser/-defluxer since this arrangement impedes the flow of air entering the exit end from the surrounding ambient environment while impeding the outflux of solvent vapor from the degreaser and the exit end thereof through the outlet end 32. In this manner, loss of solvent through solvent vapor diffusion is reduced. However, solvent liquid coating the surface of the parts 18 and trapped within recesses, holes and the like in the surface geometry of the parts is often not afforded sufficient residence time within the vapor zone so as to evaporate from the parts before they are conveyed out of the degreaser.

Figure 2:
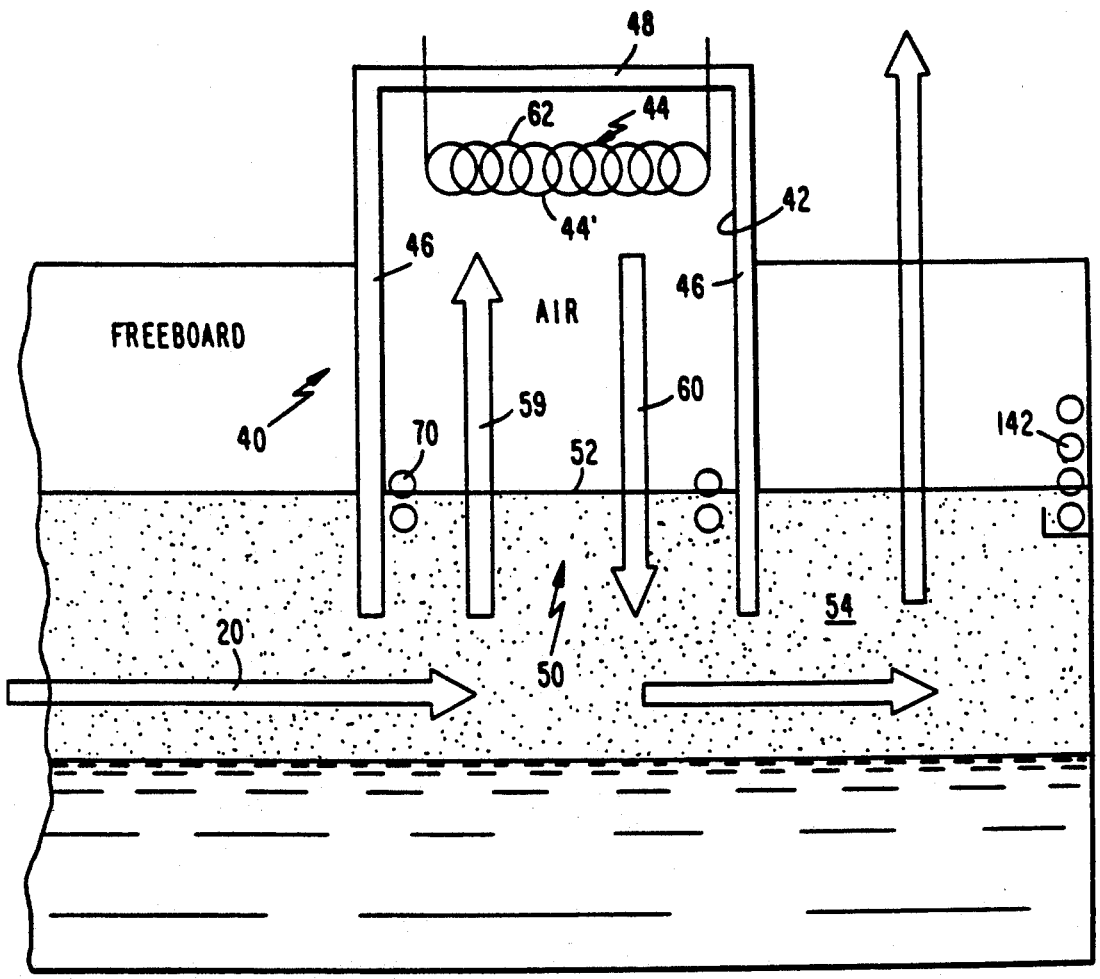
FIG. 2 is a partly schematic, elevational view of an exit end of degreasing or defluxing equipment such as depicted in FIG. 1, modified to include the present invention.

To reduce or eliminate solvent drag out losses, the present invention features a flash drying tank 40 containing a flash drying air chamber 42 provided with a heat source 44 for heating the air within the chamber to temperatures above the solvent boiling temperature. With reference to FIGS. 2 and 3, the tank 40, in accordance with one embodiment of the invention, includes four tank side walls 46 connected to each other along their lengthwise edges and a top wall 48 connected to the uppermost edges of the side walls to define the closed flash drying chamber 42. The tank bottom 50 is open and extends downwardly below the vapor line 52 into the vapor zone 54 so that the tank chamber 42 communicated solely with the vapor zone 54 through the open bottom 50 thereof.

As depicted in FIG. 3, the conveyor 20 may be rerouted (in a manner obvious to one of ordinary skill in the art based upon a review of this disclosure) to direct the clean, solvent laden parts 18 upwardly at 59 from the vapor zone 54 in the exit end 30 into the flash drying chamber 42. As the parts 18 enter the chamber 42, they are exposed to air within the chamber which has been heated to a temperature above the solvent boiling temperature prevailing within the vapor zone 54, where the hotter temperatures in the chamber quickly heat the solvent and the surfaces of the parts, resulting in rapid evaporation or "flashing off" of the solvent from the parts. The conveyor 20 then descends at 60 to lower the parts 18 back into the vapor zone 54 from the flash drying chamber 42 through the open end 50 of the tank 48. Since the parts 18 are heated (at least the surfaces thereof) to a temperature above the solvent boiling point, solvent vapor within the vapor zone 54 cannot condense upon the parts. The parts 18 therefore exit the degreaser/defluxer 10 in a substantially dry state, free of solvent liquid which would otherwise evaporate and be lost to atmosphere.

The flash drying tank 48 may obviously be constructed in a variety of configurations without departing from the spirit of the invention which is to provide a means for heating the surface of the solvent laden parts to a temperature above the solvent boiling point. For example, the flash drying tank 48 may incorporate the existing degreaser side or top walls 14,15 depending upon the geometry of the exit end 30 within the degreaser/defluxer 10, the conveyor characteristics, and the type of parts being cleaned. With reference to FIG. 3, for example, the top wall 48 of the flash drying tank 48 may be the top wall 15 of the degreaser/defluxer housing 12 defining the upper portion of the exit end 30. The side walls 42 of the flash drying tank 48 (i.e. the walls extending parallel to the direction of conveyance) may be defined by the existing degreaser/defluxer side walls 14 in the exit end 30.

The heat source 44 may be infrared, hot water, steam or hot refrigerant gas circulating within a heating coil 62 disposed in the flash drying chamber 42 or in communication with the chamber as will be discussed more fully below. The heat source 44 preferably does not have any heating elements 44' (FIG. 2) exposed to solvent vapor or liquid in chamber 42 which heating elements have a surface temperature that would cause solvent breakdown. The temperature differential between the flash drying chamber and the solvent boiling point should be as large as possible to increase evaporation rates and reduce drying times, bearing in mind the temperature sensitivity of the parts and the solvent breakdown point. It is also theorized that the preferred heating source will be electrical resistance heating means due to the capability of quickly controlling and regulating the temperatures that may be achieved with the electrical heating means.

Figure 8:
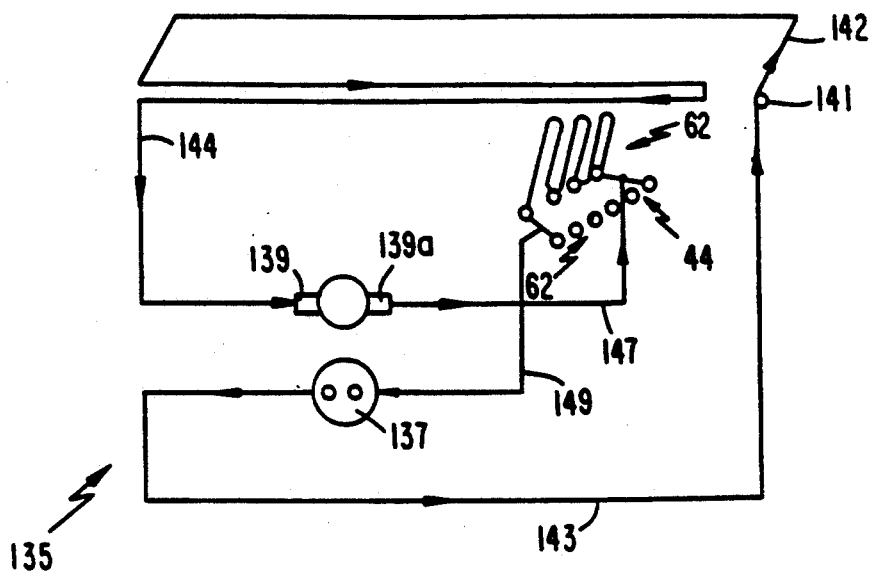
FIG. 8 is a schematic view of a refrigeration system.

Degreaser or defluxer 10 generally comprises a refrigeration system 135 typically including a liquid refrigerant condenser schematically depicted as 137 in FIG. 8 of the drawing. In accordance with conventional compression-expansion refrigeration cycle operating principles, a refrigerant gas at relatively low pressure is compressed into a "hot" refrigerant gas at high pressure by a compressor 139; the hot gas at high pressure is then passed through condenser 137 where it changes to a liquid which flows through liquid line 143 to expansion valve 141. As the hot refrigerant liquid flows through expansion valve 141, it "flashes" into a low temperature or chilled refrigerant gas where it is supplied in a known manner to one or more sets of condensing coils 142. As well known to one of ordinary skill in the art, the condensing coils 142 are positioned within upper regions of the one or more working chambers 16a–16c as well as in the upper region of exit end 30 as schematically depicted in FIG. 1. The condensing coil 142 defines the uppermost extent (vapor line) of the vapor zone 28 and provides a cold region in which solvent is condensed back into the solvent reservoirs 24 formed at that bottom of each working chamber 16a–16c as well as within the exit end 30.

In the exit end 30, the condensing coils 142 are preferably and conventionally disposed elevationally below and upstream from outlet 32 to impede the outflow of solvent vapor into the ambient environment through the exit end. The refrigerant gas is returned to compressor 139 from condensing coils 142 through a return gas line 144 as depicted in FIG. 8.

In accordance with the present invention, an optional set of condensing coils 70 may be provided within the flash drying tank 48 in elevational proximity to the solvent vapor line 52 within the exit end 30. The purpose of the optional condensing coils 70 is two-fold. First, these coils 70 regulate the location of the vapor line 52 within the tank 48 to prevent encroachment of the vapor zone 54 upwardly into the flash drying air chamber 42. Second, the optional condensing coils 70 serve to condense solvent vapor which has flashed off from the drying parts 18 within the chamber 42 so as to re-direct the solvent back into the vapor zone while maintaining the concentration of solvent vapor at a constant level within the flash drying air chamber. Variations in the concentration of solvent vapor within the air chamber 42 may adversely affect heat transfer within the chamber and to the solvent laden parts entering the chamber along the conveyor means 20.

In accordance with another feature of this invention, the heating source 44 may be in the form a heating coil 62 which essentially functions as the condenser of the compressor section of refrigeration system 135. In other words, the heating coil 62 may be connected to the outlet 139a of compressor 139 to receive compressed "hot" refrigerant gas directly from the compressor through gas inlet line 147 where the waste heat of the "hot" refrigerant gas is utilized to heat the articles conveyed along conveyor 120 into the flash drying chamber 42. With a conventional refrigeration system 135, the temperature of the heating coil 62 (condenser of the refrigeration system) will typically be approximately 180°–210° F., whereas the boiling temperature of the solvents typically utilized in such degreasing or defluxing equipment is approximately 110° F. (i.e., for CFC-113 and Freon type solvents) or about 86° F. for the newer HCFC solvents. Therefore, with the foregoing arrangement, the waste heat from the refrigeration system 135 may be utilized as a means to locally heat the articles 18 in the exit end 30 as the articles are conveyed through the flash drying chamber 42 to evaporate liquid solvent coating trapped within the articles prior to exiting the degreaser/defluxer through outlet 32.

Figure 4:
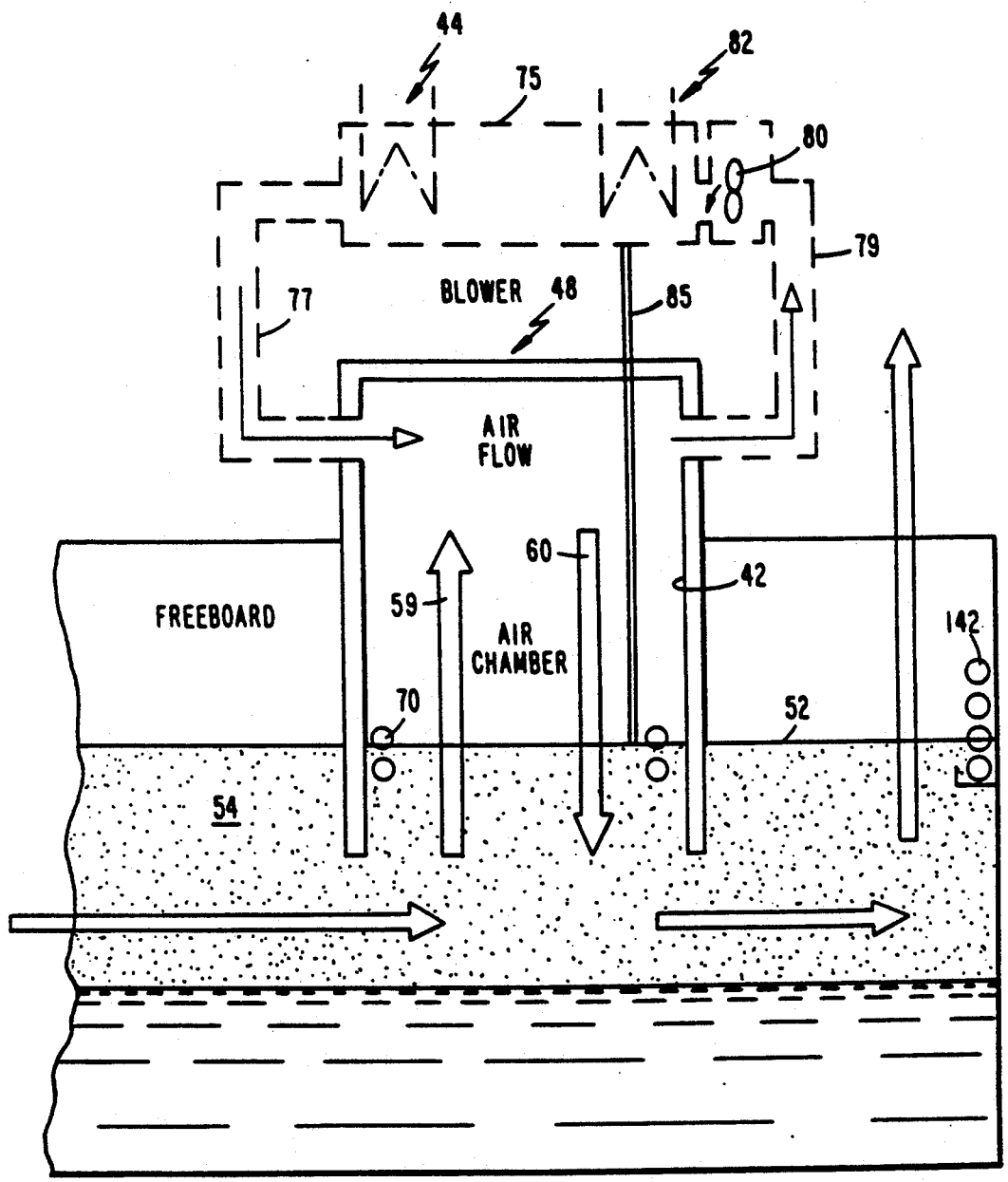
FIG. 4 is a partly schematic, elevational view of a second embodiment of the invention located in the exit end of degreasing or defluxing equipment such as depicted in FIG. 1.

FIG. 4 is an illustration of a second embodiment of the invention which may be advantageous in preventing excessive concentrations of solvent laden air within the flash drying air chamber 42, by removing the solvent laden air from the chamber, dehumidifying it and then returning the air (heated) to the flash drying air chamber in a continuous heating cycle. In this embodiment, an auxiliary housing 75 is connected to the flash drying air chamber 42 through inlet and outlet ducts 77 and 79, respectively. The heating source 44 (e.g., heating coil 62) is located within the housing 75 downstream from a dehumidifying coil 82 (which may be similar to a condensing coil 142 in parallel or series within the refrigeration system 135) also disposed in the housing downstream from a blower 80 located within outlet duct 79. With this arrangement, the solvent laden air is continuously pulled by blower 80 from the flash drying air chamber 42 where it flows through the outlet duct 79 to pass over the dehumidifying coil 82. The dehumidifying coil 82 condenses the solvent vapor from the solvent laden air and returns the liquid solvent to the degreaser or defluxer through a return line 85. The solvent stripped air is then directed by the forced air convection of blower 80 across the heating coil 62 where it is heated and returned to the air chamber 42 through the inlet duct 77.

Although in the FIG. 4 embodiment the heating source 44 and dehumidifying coil 82 are disclosed as being in parallel or series within the refrigeration system 135, both the heating source and dehumidifying coil may be driven by a separate compressor as a part of a separate refrigeration circuit (not shown).

In the FIG. 4 embodiment, the heating source 44 is located in the auxiliary housing 75 which forms a closed loop with the flash drying air chamber 42. Optionally, however, further heating sources may be positioned within the flash drying chamber 42 in conjunction with, or in place of, the heating coil 62 within the auxiliary housing.

In place of, or in series or parallel connection with the dehumidifying coil 82, there may be provided an activated carbon filter (see FIG. 10,400) through which the solvent laden air is directed with the solvent stripped from the air by the activated carbon within the filter. In a known manner, the solvent accumulating in the activated carbon can be reclaimed using conventional steam and gas stripping processes. To prevent excessive build-up of solvent within the filter, it may be preferable to position the activated carbon filter in series with and downstream from the dehumidifying cooling coil 82.

In accordance with the invention, the solvent laden air may also be passed through molecular sieves or membranes (see FIG. 10,400) to strip the solvent from the air before the air is returned to the flash drying air chamber 42.

Figure 9:
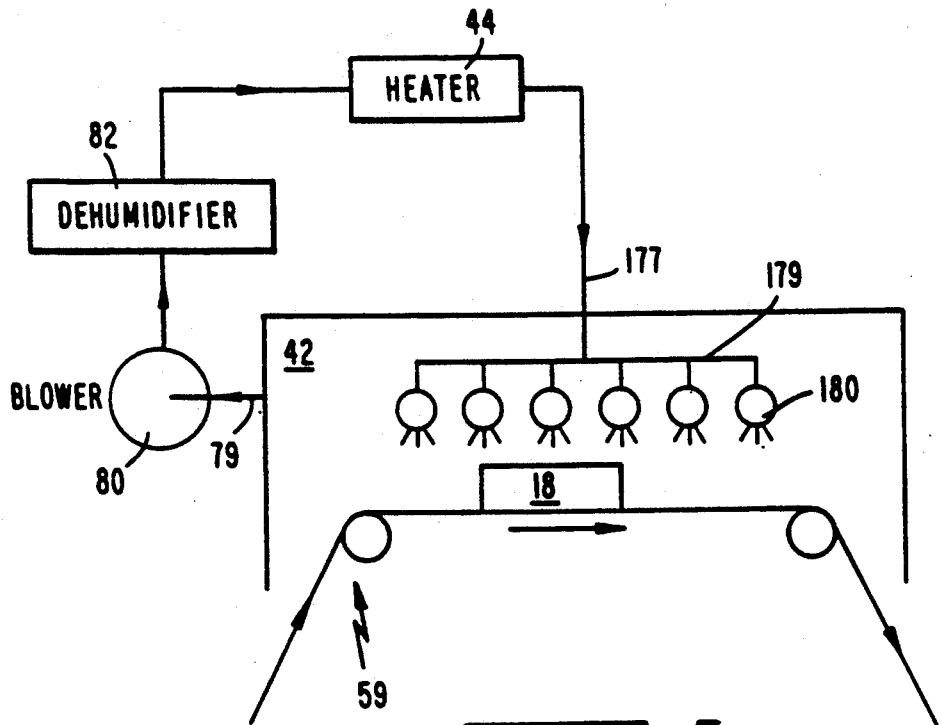
FIG. 9 is a schematic view of a third embodiment of the invention.

FIG. 9 is an illustration of a third embodiment of the invention wherein heating source 44 and dehumidifying or cooling coil 82 are disposed outside flash drying tank 40 such as in an auxiliary housing 75 with a blower 80 disposed in ducting 79 in a manner similar or identical to that depicted in the FIG. 4 embodiment of the invention. However, instead of returning the dehumidified and heated air to the flash drying air chamber 42 through an inlet duct 77 as in the FIG. 4 embodiment, the dehumidified and heated air is returned to the chamber 42 through an inlet duct 177 supplying the treated air to the chamber interior through a manifold 179 and air nozzles or knives 180. As depicted in FIG. 9, the air nozzles or knives 180 are located above and parallel to the re-routed part 59 of conveyor 20 (FIG. 3) extending horizontally within the flash drying chamber. The nozzles or knives 180 therefore extend along the direction of conveyance in spaced relationship to each other and are aimed in the counter-flow direction opposite the conveyor path.

The foregoing FIG. 9 arrangement improves heat transfer and solvent evaporation by the action of a forced air stream impacting against the parts 18 moving along conveyor 20 within chamber 42. It will also be appreciated that, with the foregoing arrangement, the parts 18 will move through a zone of decreasing solvent vapor concentration, thereby improving solvent evaporation in the direction of conveyance, due to the placement of the outlet duct 79 upstream from re-routed conveyor part 59. FIG. 10 is similar to FIG. 9 except that a carbon filter means or molecular sieve 400 is used in place of the dehumidifier 82.

Figure 5:
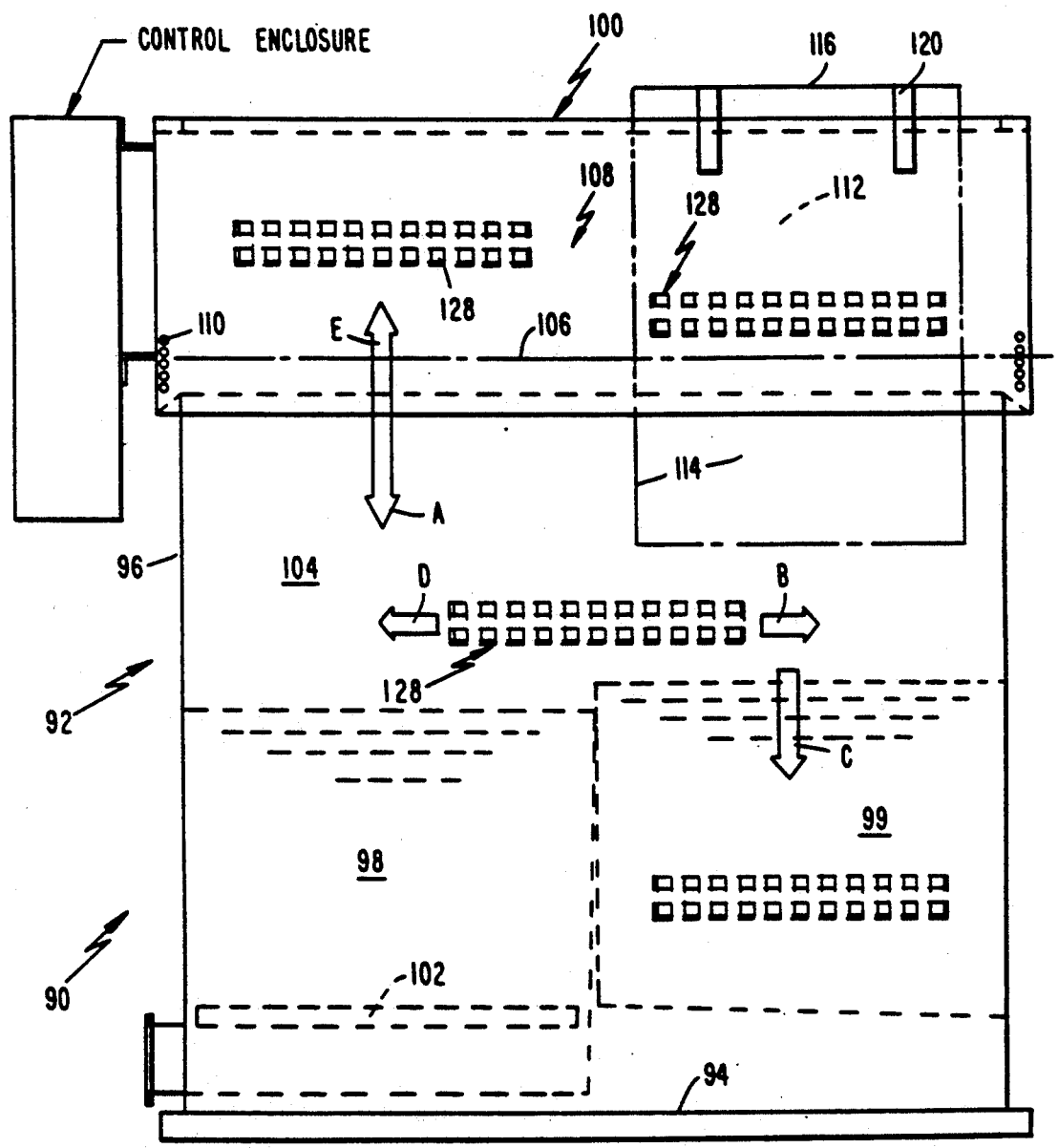
FIG. 5 is a partly schematic, elevation view of a conventional open top degreaser or defluxer modified to include the present invention.
Figure 6:
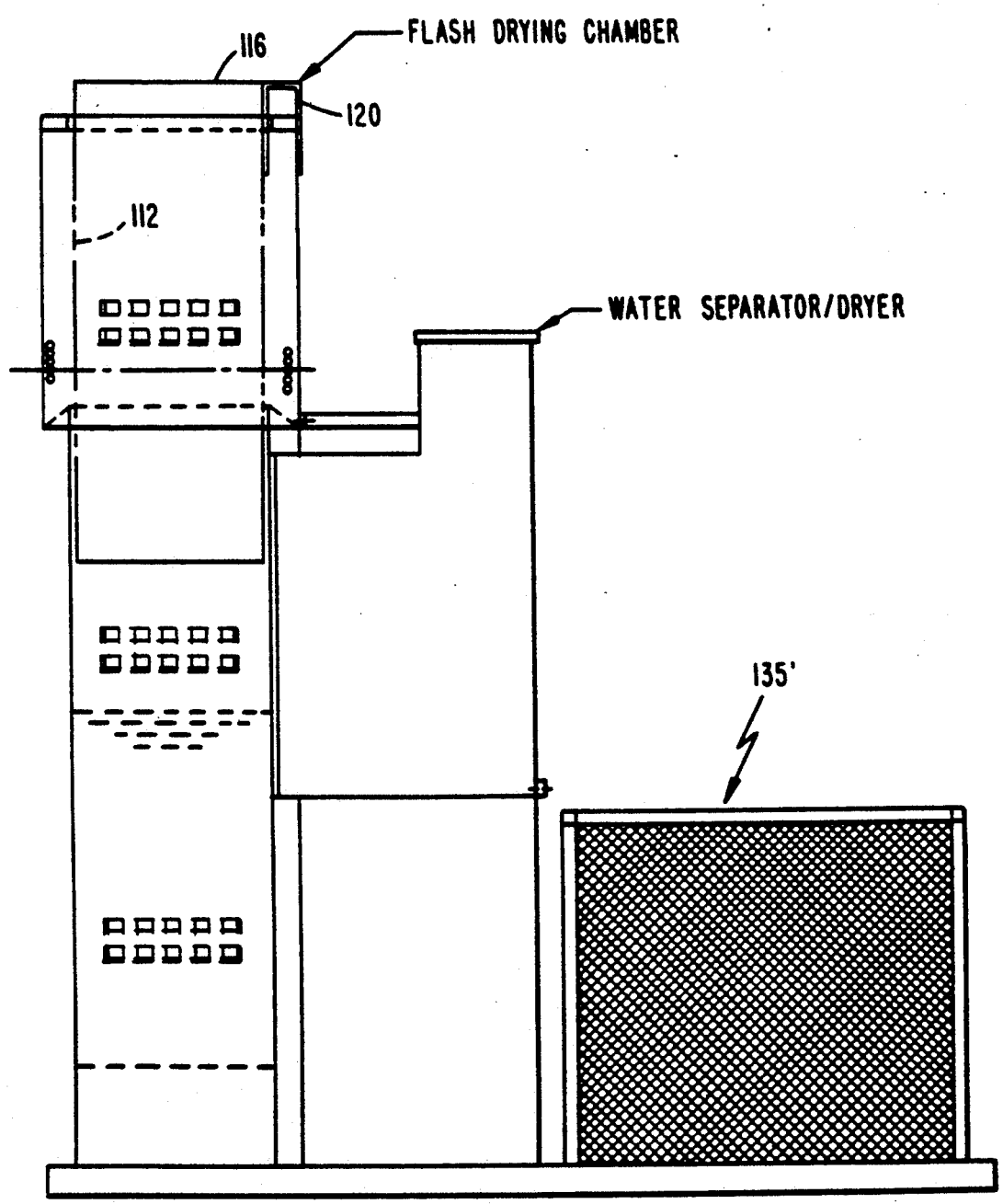
FIG. 6 is a side elevational, partly schematic, view of the invention of FIG. 5.
Figure 7:
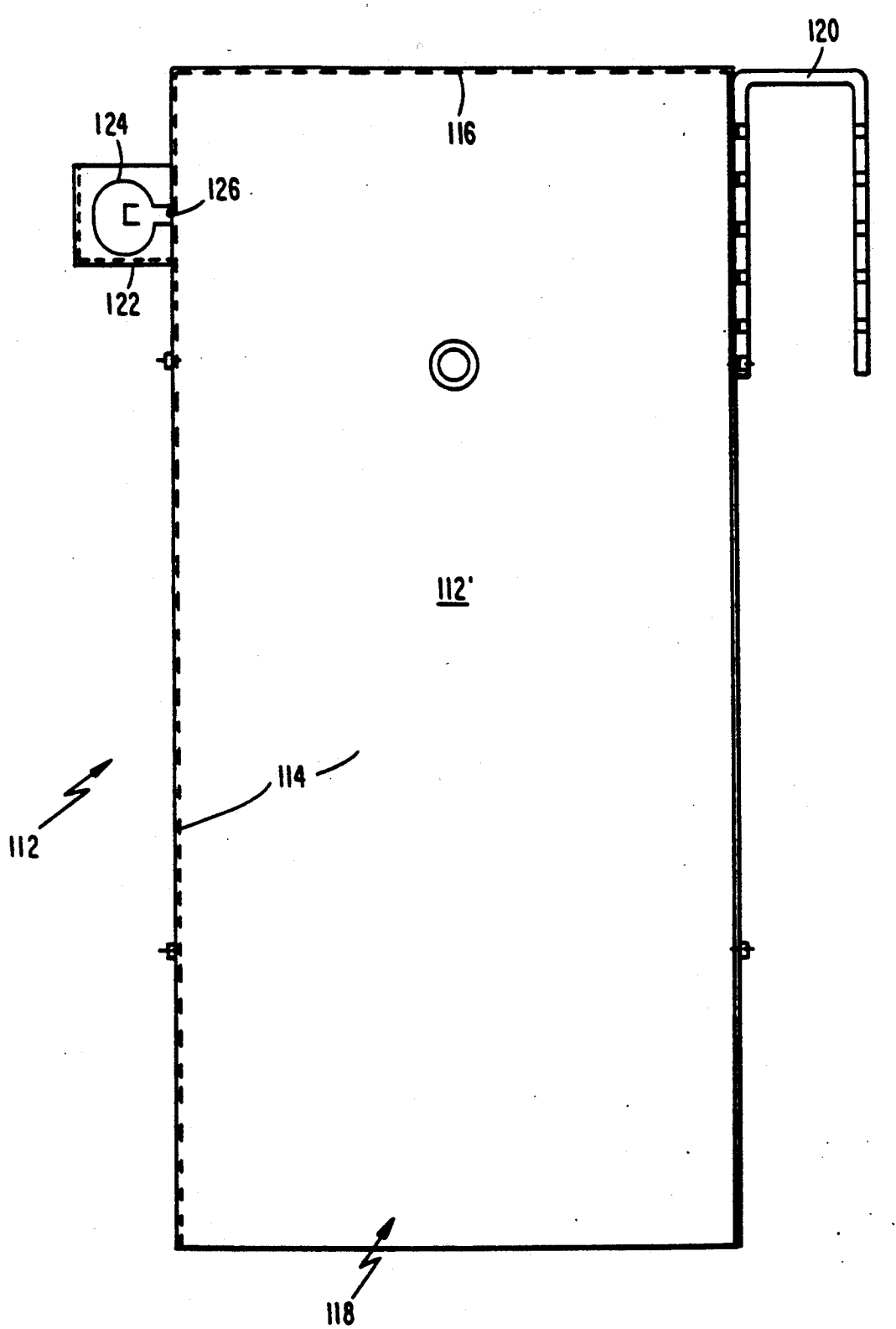
FIG. 7 is a sectional elevational view of a flash drying tank in accordance with the invention such as may be used with open top or in-line conveyorized degreasing-/defluxing equipment.

FIGS. 5-7 are illustrations of a further embodiment of the flash drying tank of the invention in an open top degreaser or defluxer 90. With reference to FIGS. 5 and 6, a conventional open top degreaser/defluxer 90 is typically formed with an open top tank 92 having a bottom 94 and upright side walls 96 with a solvent partially filling the bottom of the tank in a boil sump 98 and a rinse sump 99 thereof. The boil and rinse sumps 98,99 are in substantial vertical alignment with the open top 100 of the tank 92. Conventional electrical resistance heating elements 102 heat the solvent to boiling temperature in the boil sump 98 whereupon the solvent vapors generated by the boiling solvent within the sumps create a vapor zone 104 having an upper limit defined by a vapor line 106. The vapor zone 104 extends above both the boil and rinse sumps 98,99. There is a freeboard region 108 extending from the vapor line to the open top 100 of the degreaser/defluxer 90. The vapor line 106 is defined by refrigerant condensing chill coils 110 extending along the inner surfaces of the tank side walls. A refrigeration system 135' similar to refrigeration system 135 provides chilled refrigerant to the condensing coils 110.

In accordance with the present invention, there is provided a flash drying tank 112 formed with four tank side walls 114 connected along their lengthwise edges and a top wall 116 connected along its periphery to the upper edges of the side walls to define a closed top and an open ended bottom 118 as best viewed in FIG. 7. A pair of inverted U-shaped hanging brackets 120 are secured to one of the tank side walls 114 to enable mounting of the tank 112 within the freeboard region 108 of the open top degreaser/defluxer 90 substantially in vertical alignment with the rinse sump 99. The lengths of the tank side walls 114 are sufficient to locate the open bottom 118 below the vapor line 106. With reference to FIG. 7, one of the tank side walls 114 may also contain a heater manifold 122 in which resistance heating elements 124, heating coils, etc. are located to supply heat into the flash drying air chamber 112' through openings 126 formed in the tank side wall 114 along the manifold 122.

In operation, parts to be degreased or defluxed are typically lowered with a basket 128, hoist, etc. through the open top 100 of the defluxer 90 into the boil sump 98 in the direction of arrow A. After a predetermined residence time, the parts are lifted in the basket 128 from the boil sump 98 back into the vapor zone 104 and then moved in the direction of arrow B into vertical alignment with the rinse sump 99 and open bottom 118 of the flash drying tank 112. The parts are then lowered into the rinse sump 99 in the direction of arrow C and then raised upwardly from the rinse sump into the vapor zone 104. Continued upward vertical lifting movement then brings the basket 128 and parts into the flash drying air chamber 112' through the open bottom 118 of the tank 112 where the parts are superheated to a temperature above the solvent boiling point to enable rapid flash off of liquid solvent from the parts. After a suitable residence time within the flash drying tank 112, the parts are lowered out of the air chamber 112' through the open bottom 118 into the vapor zone 104. The parts are then shifted laterally in the direction of arrow D to return into vertical alignment with that portion of the open top 100 of defluxer 90 not obstructed by the flash drying tank 112. The parts are then lifted out of the open top degreaser/defluxer in the direction of arrow E through the unobstructed region.

The feature of an easily detachable flash drying tank 112 having a self-contained heater manifold 122 enables easy retro-fitting of existing open top degreasing/defluxing equipment since the flash drying tank is easily mounted to a side wall of the equipment via hanging brackets 120. If electrical resistance heating elements 124 are employed as the heating source, they may be simply wired into the user's available source of electricity for ease of operation. From this disclosure, it will also occur to one of ordinary skill in the art that an easily detachable flash drying tank may be provided for conveyorized, in-line defluxing/degreasing equipment as well without departing from the scope of this invention.

It will be readily seen by one of ordinary skill in the art that the present invention fulfills all the objects set above. After reading the foregoing specification, one of ordinary skill will be able to effect various changes, substitutions of equivalents and various other aspects of the invention that broadly disclosed hearing period it is therefore intended that the protection granted hereon be only limited only by the definition contained in the appended claims and equivalents thereof.

We claim:

1. In a vapor degreaser or a solvent defluxer having a vessel containing a solvent liquid with a vapor phase extending thereabove having a vapor line defining an upper limit of the vapor zone, wherein parts to be defluxed or degreased are brought into the vessel into intimate cleaning contact with the solvent, said parts tending to contain liquid solvent trapped or coated on said parts, the improvement comprising housing means for defining a flash drying chamber extending above the vapor line in communication with the vapor zone; means for conveying the parts out of the vapor zone into the flash drying chamber and thereafter back into the vapor zone; means for heating the air in the flash drying chamber to a temperature above the solvent boiling point to thereby evaporate the liquid solvent on said parts; and optionally means for preventing excessive concentrations of solvent laden air within the flash drying chamber.

2. In the degreaser/defluxer of claim 1, wherein said flash drying chamber is a tank formed with a closed top and an open end bottom defined by lower edges of side walls defining the tank, said open end bottom extending into the vapor zone below the vapor line so that parts moving in the vapor zone may enter and exit the chamber from the vapor zone through the open bottom.

3. In the degreaser/defluxer of claim 2, wherein said heating means is disposed in the flash drying chamber above the vapor line.

4. In the degreaser/defluxer of claim 3, wherein said heating means is a heating source having a surface temperature which is less than a temperature which would cause a breakdown of solvent contacting the heating source.

5. In the degreaser/defluxer of claim 2, wherein said heating means is electrical heating means.

6. In the degreaser/defluxer of claim 2, wherein said heating means is infrared heating means.

7. In the degreaser/defluxer of claim 2, wherein said heating means is hot water heating means passing through a coil means.

8. In the degreaser/defluxer of claim 2, wherein said heating means is steam heating means.

9. In the degreaser/defluxer of claim 2, wherein said degreaser/defluxer further includes condensing coil means located in a solvent containing region of the vessel and at the vapor line of the solvent containing region for condensing solvent vapor rising from said vapor zone back into the solvent containing region, said condensing coil means being located outside of the flash drying chamber; and refrigeration system means, including a compressor section and an evaporator section, for supplying chilled refrigerant to said condensing coil means, wherein said heating means is connected to receive hot refrigerant gas from a compressor in the compressor section of the refrigeration system means, said heating means thereby being a condenser within said refrigeration system means.

10. In the degreaser/defluxer of claim 1, further comprising condensing coil means located within the flash drying chamber at the vapor line for condensing solvent vapor tending to rise from the vapor zone into the flash drying chamber back into the vapor zone, while also condensing solvent vapors evaporated from the parts in the flash drying chamber.

11. In the degreaser/defluxer of claim 10, further including refrigeration system means for supplying chilled refrigerant to said condensing coil means.

12. In the degreaser/defluxer of claim 11, wherein said refrigeration system means includes a compressor section and an evaporator section, for supplying chilled refrigerant to said condensing coil means and wherein said heating means includes heating coil means connected to receive hot refrigerant gas from a compressor in the compressor section of the refrigeration system means, said heating means thereby being a condenser within said refrigeration system means.

13. In the degreaser/defluxer of claim 1, further comprising means for moving hot air across the part(s) in the flash drying chamber to enhance drying of the parts.

14. In the degreaser/defluxer of claim 1, further comprising an inlet duct connected to the flash drying chamber, said heating means and a blower means being arranged to generate a flow of heated air directed into the chamber through the inlet duct.

15. In the degreaser/defluxer of claim 14, further including an outlet duct connected to the flash drying chamber to enable discharge of solvent laden air from the chamber.

16. In the degreaser/defluxer of claim 15, further including dehumidifying coil means in communication with the outlet duct to condense the solvent from the solvent laden air received from the chamber.

17. In the degreaser/defluxer of claim 16, further including auxiliary housing means in which said dehumidifying coil means and heating means are disposed downstream from the blower means, whereby the dehumidifying coil means is located to receive the solvent laden air from the flash drying chamber through the outlet duct and said heating means is disposed downstream from the dehumidifying coil means to enable heated air to be directed into the flash drying chamber through the inlet duct.

18. In the degreaser/defluxer of claim 15, further comprising activated carbon filter means in communication with the flash drying chamber through the outlet duct to receive solvent laden air from the flash drying chamber which flows through the activated carbon in the filter to strip the solvent from the solvent laden air.

19. In the degreaser/defluxer of claim 15, further including a molecular sieve positioned to receive solvent laden air from the flash drying chamber to strip said solvent from the solvent laden air.

20. In the degreaser/defluxer of claim 1, further including an outlet duct connected to the flash drying chamber to enable discharge of solvent laden air from the chamber.

21. In the degreaser/defluxer of claim 1, further including a first duct connected to the flash drying chamber to enable discharge of solvent laden air from the chamber, and further including dehumidifying coil means in communication with the first duct to condense the solvent from the solvent laden air received from the chamber through the first duct and heating means disposed downstream from the dehumidifying coil means for heating said air, and means for returning said dehumidified and heated air to the chamber, and nozzle means connected to the return means for forcibly directing a flow of said heated and dehumidified air against the solvent laden parts being conveyed through the chamber to thereby evaporate the liquid solvent from said parts.

22. In the degreaser/defluxer of claim 21, wherein said first duct has an inlet in the flash drying chamber located upstream from the conveyor and said nozzle means is disposed above and generally parallel to the conveyor run within the chamber to thereby enable the solvent laden parts being conveyed therein to move through a zone of decreasing solvent vapor concentration.

23. In the degreaser/defluxer of claim 22, further comprising blower means in communication with the first duct for generating forced convection of air between the chamber, dehumidifying coil means and the heating means.

24. In the degreaser/defluxer of claim 23, wherein said nozzle means include a plurality of air nozzles or knives having outlets aimed in a counter-flow direction to the direction opposite the direction of conveyance.

25. In the degreaser/defluxer of claim 22, wherein said nozzle means is connected to the return means through a manifold and said nozzle means further includes a plurality of sets of nozzles, each set extending in the widthwise direction of the conveyor means.

26. A degreaser or defluxer, comprising, in combination:
  a) a vessel having means defining at least one solvent containing region;
  b) means for moving parts to be defluxed or degreased into intimate cleaning contact with the solvent containing region and then outwardly from the solvent containing region;
  c) housing means for defining a flash drying chamber extending above a vapor line of a solvent vapor phase and in communication with the vapor phase;
  d) means for conveying a part out of the vapor phase or zone into the flash drying chamber and thereafter back into the vapor zone; and
  e) means for heating the air in the flash drying chamber to a temperature above the solvent boiling point to thereby evaporate the liquid solvent upon said part(s).

27. The degreaser/defluxer of claim 26, wherein said flash drying chamber is a tank formed with a closed top and an open end bottom defined by lower edges of side walls defining the tank, said open end bottom extending into a vapor zone below a vapor line so that parts moving in the vapor zone may enter and exit the chamber from the vapor through the open bottom.

28. The degreaser/defluxer of claim 27, wherein said heating means is disposed in the flash drying chamber above the vapor line.

29. The degreaser/defluxer of claim 26, further comprising condensing coil means located within the flash drying chamber at the vapor line for condensing solvent vapor tending to rise from the vapor zone into the flash drying chamber back into the vapor zone.

30. The degreaser/defluxer of claim 29, further including refrigeration system means for supplying chilled refrigerant to said condensing coil means.

31. A method of limiting outflux of a solvent from a degreaser/defluxer containing a supply of solvent through which articles or parts to be degreased or defluxed are moved into and out of the degreaser/defluxer, comprising the steps of:
  a) moving said articles or parts into contact with at least one of said solvent supply or a vapor zone thereof;
  b) directing said articles or parts into an exit area of the degreaser/defluxer containing a solvent vapor zone;
  c) directing said articles or parts into a flash drying chamber extending above the vapor line of the vapor zone and which flash drying chamber is in communication with the vapor zone;
  d) heating the air in the flash drying chamber to a temperature above the solvent boiling point to thereby evaporate the liquid solvent on said parts in said chamber;
  e) directing said parts back into the vapor zone; and
  f) exiting said parts from the said vapor zone of the degreaser/defluxer.

* * * * *